(12) United States Patent
Tanabe

(10) Patent No.: US 7,014,916 B2
(45) Date of Patent: Mar. 21, 2006

(54) TRANSPARENT TOUCH PANEL

(75) Inventor: Koji Tanabe, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 107 days.

(21) Appl. No.: 10/625,598

(22) Filed: Jul. 24, 2003

(65) Prior Publication Data

US 2004/0130536 A1    Jul. 8, 2004

(30) Foreign Application Priority Data

Aug. 8, 2002 (JP) .............................. 2002-231392

(51) Int. Cl.
*B32B 9/04* (2006.01)
*G08B 5/36* (2006.01)
(52) U.S. Cl. ........................ 428/447; 428/336; 345/173
(58) Field of Classification Search ............... 428/195, 428/697, 699, 336, 447; 345/173
See application file for complete search history.

(56) References Cited

U.S. PATENT DOCUMENTS

| 6,507,337 B1 * | 1/2003 | Sato et al. ................... 345/173 |
| 6,689,458 B1 * | 2/2004 | Mikoshiba et al. ......... 428/339 |
| 6,787,253 B1 * | 9/2004 | Iwabuchi et al. ........... 428/698 |

* cited by examiner

*Primary Examiner*—Stephen Stein
(74) *Attorney, Agent, or Firm*—Wenderoth, Lind & Ponack, L.L.P.

(57) ABSTRACT

The present invention relates to a transparent touch panel used for operating various electronic apparatuses. More particularly, the invention relates to a transparent touch panel where a dent is hardly generated and an electrical conductive layer is hardly damaged even when an upper surface of the transparent touch panel is continuously pressed. The transparent touch panel includes a sheet formed by sticking an upper film to a lower film via a rubber elastic layer.

11 Claims, 1 Drawing Sheet

TRANSPARENT TOUCH PANEL

BACKGROUND OF THE INVENTION

1. Field of the Invention

The present invention relates to a transparent touch panel used for operating various electronic apparatuses.

2. Background Art

Recently, as electronic apparatuses have become more functional and diversified, the production of an electronic apparatus having a transparent touch panel mounted on a front surface of its display device such as a liquid crystal device has been increased. A character, sign, pattern, letter or the like which is shown on the display device is visually identified and selected using the transparent touch panel, and functions of the electronic apparatus are switched by operation of the transparent touch panel.

The conventional transparent touch panel mentioned above is described hereinafter with reference to FIG. 2. The conventional transparent touch panel has a light transmitting sheet 7. The light transmitting sheet 7 has a light transmitting upper film 1 such as polyethylene terephthalate or polycarbonate, a light transmitting lower film 2 and an acrylic adhesive layer 3 for sticking the upper film 1 to the lower film 2. An undercoat layer 4 is formed on a lower surface of lower film 2, and an upper electrical conductive layer 5 such as indium oxide tin or tin oxide is formed on undercoat layer 4 using a vacuum sputtering method or the like. Hard coat layer 6 is formed on an upper surface of upper film 1.

An undercoat layer 9 and a lower electrical conductive layer 10 are formed on an the upper surface of a light transmitting substrate 8, such as a polyethylene terephthalate film, glass, or acrylic, in the same way as lower film 2. A plurality of dot spacers 11 are formed on an upper surface of conductive layer 10 at predetermined intervals for keeping a certain space from conductive layer 5, and dot spacers 11 are made of insulating resin such as epoxy resin or silicone resin.

Then, sheet 7 and substrate 8 are stuck to each other at their outer peripheries using frame shaped spacer 12 to which adhesive is applied on an upper surface and a lower surface. Therefore, conductive layer 5 confronts conductive layer 10 with a predetermined space therebetween. Thus, the transparent touch panel is constructed.

In the transparent touch panel discussed above, upper lead electrodes (not shown) are formed on both sides of conductive layer 5, and lower lead electrodes (not shown) are formed on both sides of conductive layer 10 in an orthogonal direction with respect to the upper lead electrodes. Upper and lower lead electrodes are coupled with a detector (not shown) of the electronic apparatus via a connector for coupling. When an upper surface of sheet 7 is pressed with a finger, a pen or the like, sheet 7 is bent, so that upper electrical conductive layer 5 contacts the lower electrical conductive layer 10 at the pressed point.

The pressed point is detected by a resistance ratio between the upper lead electrode and the lower lead electrode using the detector, so that functions of the electronic apparatus are switched.

However, in the conventional transparent touch panel discussed above, when a certain point of the upper surface of sheet 7 is continuously pressed by a strong force through the finger or the operational pen, gel type adhesive layer 3 is pressed and moves toward a circumference of the pressed point. Thus, a thickness at the pressed point becomes thin. As a result, a dent tends to remain on an upper surface of upper film 1 even when the pen is removed, or upper electrical conductive layer 5 at the pressed point tends to be damaged.

SUMMARY OF THE INVENTION

The present invention is directed to provide a transparent touch panel in which a dent is hardly generated on a film and an electrical conductive layer is hardly damaged even when an upper surface of the transparent touch panel is continuously pressed by strong force.

The transparent touch panel of this invention includes a sheet formed by sticking an upper film to a lower film via a rubber elastic layer, in which the upper film and the lower film each has a light transmitting characteristic and a thickness of 150 $\mu$m or less.

DETAILED DESCRIPTION OF PREFERRED EMBODIMENT

A transparent touch panel of this invention includes a sheet formed by sticking an upper film to a lower film via a rubber elastic layer, in which the upper film and the lower film each has a light transmitting characteristic and a thickness of 150 $\mu$m or less. In this structure mentioned above, the rubber elastic layer immediately returns (re-forms) by its elastic force when a certain force is applied to and removed from the touch panel. As a result, the transparent touch panel in which a dent is hardly generated on a film, and in which an electrical conductive layer is hardly damaged can be obtained. This effect can not be obtained by using a conventional gel type adhesive layer.

In the transparent touch panel of this invention, the rubber elastic layer is made of silicone rubber preferably having the following characteristics:
   a) hardness of 10–70 (condition of measurement: scale A of Rockwell hardness test in Japanese Industrial Standards),
   b) a compressive permanent distortion factor of 50% or less (condition of measurement: 70° C. 22 hours of B method in American Society for Testing and Material),
   c) total light transmittance of 90% or more, and
   d) a thickness of 5 $\mu$m or more.

Heat resistance is improved by using the rubber elastic layer compared to rubber such as polyuretane or acrylic, so that the touch panel can be used even at a high temperature.

Furthermore, the transparent touch panel of this invention preferably has a hard coat layer on an upper (outer) surface of the sheet. Wear resistance is improved by forming the hard coat layer so that the surface of the sheet is prevented from damage caused by a finger, a pen or the like in operation.

The exemplary embodiment of this invention is described hereinafter with reference to FIG. 1. A dimension of a thickness is enlarged in FIG. 1 for easily understanding the structure. Furthermore, those skilled in the art would readily understand that the touch panel of the present invention is to be applied to an electronic apparatus (as noted above). Thus, the terms "inner" and "outer" or "upper" and "lower" are used below to describe the touch panel with respect to a body of the electrical apparatus.

EMBODIMENT

Figure 1:
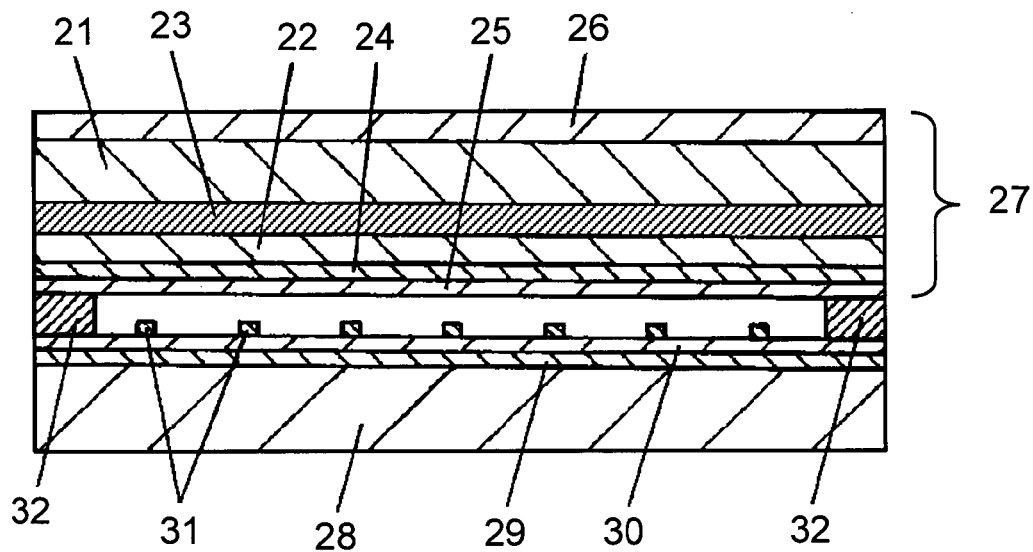
FIG. 1 shows a sectional view of a transparent touch panel in accordance with a first exemplary embodiment of the present invention.

As shown in FIG. 1, the transparent touch panel of this invention has light transmitting sheet 27. The light transmitting sheet 27 has a second light transmitting film 21 (hereinafter referred to as "upper film 21"), a first light transmitting film 22 (hereinafter referred to as "lower film 22"), and a rubber elastic layer 23 for sticking upper film 21 to lower film 22. In addition, an undercoat layer 24 and a first electrical conductive layer 25 (hereinafter referred to as "upper electrical conductive layer 25") are formed on a lower (inner) surface of lower film 22, and hard coat layer 26 is formed on an upper (outer) surface of upper film 21.

Upper film 21 and lower film 22 are light transmitting films of 150 $\mu$m thickness or less, and are made of polyethylene terephthalate, polycarbonate or the like.

Rubber elastic layer 23 is made of silicone rubber having the following characteristics:
  a) hardness of 10–70 (condition of measurement: scale A of Rockwell hardness test in Japanese Industrial Standards),
  b) a compressive permanent distortion factor of 50% or less (condition of measurement: 70° C., 22 hours of B method in American Society for Testing and Material),
  c) total light transmittance of 90% or more, and
  d) a thickness of 5 $\mu$m or more.

Besides the adherent silicone rubber, fluorine rubber can be used as rubber elastic layer 23. In addition, though heat resistance does not improve compared to the silicone rubber, polyuretane rubber, acrylic rubber, ethylene-propylene rubber, isoprene rubber, butadiene rubber, polystyrene base thermoplastic elastomer, 1,2-polybutadiene base thermoplastic elastomer or the like can be also used. Using cross-linkable transparent silicone adhesive, superior heat resistance and transparency can be obtained, and a volatile solvent or the like hardly occurs and remains in a manufacturing process. As a result, efficiency, reliability and productivity can be improved. Undercoat layer 24 is made of silica or phenoxy resin, and upper electrical conductive layer 25 is made of indium tin oxide, tin oxide or the like formed by a vacuum sputtering method or the like. Hard coat layer 26 is made of a transparent material such as acrylic resin.

An undercoat layer 29 and a second electrical conductive layer 30 (hereinafter referred to as "lower electrical conductive layer 30") are formed on an upper (outer) surface of a light transmitting substrate 28.

A plurality of dot spacers 31 are formed on an upper (outer) surface of lower electrical conductive layer 30 at predetermined intervals for keeping the lower electrical conductive layer at a certain space from upper electrical conductive layer 25, and the dot spacers 31 are made of insulating resin such as epoxy resin or silicone resin. A polyethylene terephthalate film, glass, acrylic or the like can be used as light transmitting substrate 28.

Sheet 27 and substrate 28 are stuck to each other at their outer peripheries using frame shaped spacer 32 to which adhesive is applied on an upper surface and a lower surface thereof so that the upper electrical conductive layer 25 confronts the lower electrical conductive layer 30 with a predetermined space therebetween. Thus, the transparent touch panel of this invention is constructed.

In the transparent touch panel discussed above, upper lead electrodes (not shown) are formed on both sides of upper electrical conductive layer 25, and lower lead electrodes (not shown) are formed on both sides of lower electrical conductive layer 30 in an orthogonal direction with respect to the upper lead electrodes. Upper and lower lead electrodes are coupled with a detector (not shown) of an electronic apparatus via a connector for coupling. When an upper surface of sheet 27 is pressed with a finger, a pen or the like, sheet 27 is bent, so that upper electrical conductive layer 25 contacts the lower electrical conductive layer 30 at the pressed point. In other words, light transmitting sheet 27 is flexible. In this regard, the term "flexible" as used herein means sufficiently pliable to allow the light transmitting sheet 27 to be bent enough to move across the space formed by spacer 32 so as to contact the lower conductive layer 30. The detector detects the pressed point using a resistance ratio between the upper lead electrode and the lower lead electrode, so that functions of the electronic apparatus can be controlled or switched.

A manufacturing method and an evaluating method of the transparent touch panel of this invention are described hereinafter in detail.

Undercoat layer 24 and upper electrical conductive layer 25 have been formed on a lower (inner) surface (i.e., a surface of one side) of lower film 22 (e.g., "300RKW", PET film of 25 $\mu$m thickness manufactured by Toyobo Co., Ltd.). Rubber elastic layer 23 made of silicone rubber (e.g., "super transparent silicone rubber" manufactured by Asahi Rubber Inc.) is joined to lower film 22. Then a lower surface of upper film 21 having hard coat layer 26 on the upper (outer) surface is joined to an upper surface of rubber elastic layer 23. After that, upper film 21 and lower film 22 are stuck to each other by cross-linking the rubber, thereby making light transmitting sheet 27. PET film of 125 $\mu$m thickness is used as upper film 21. In this embodiment, a sheet-type silicone-rubber adhesive is used for improving productivity. However, the same efficiency can be obtained using liquid-type silicone-rubber adhesive.

Then, sheet 27 is stuck to substrate 28, on which lower electrical conductive layer 30 and dot spacers 31 are formed on an upper surface, using the frame shaped spacer 32 to which adhesive is applied on an upper surface and a lower surface. Thus, the transparent touch panel of this embodiment is provided.

COMPARATIVE EXAMPLE

Figure 2:
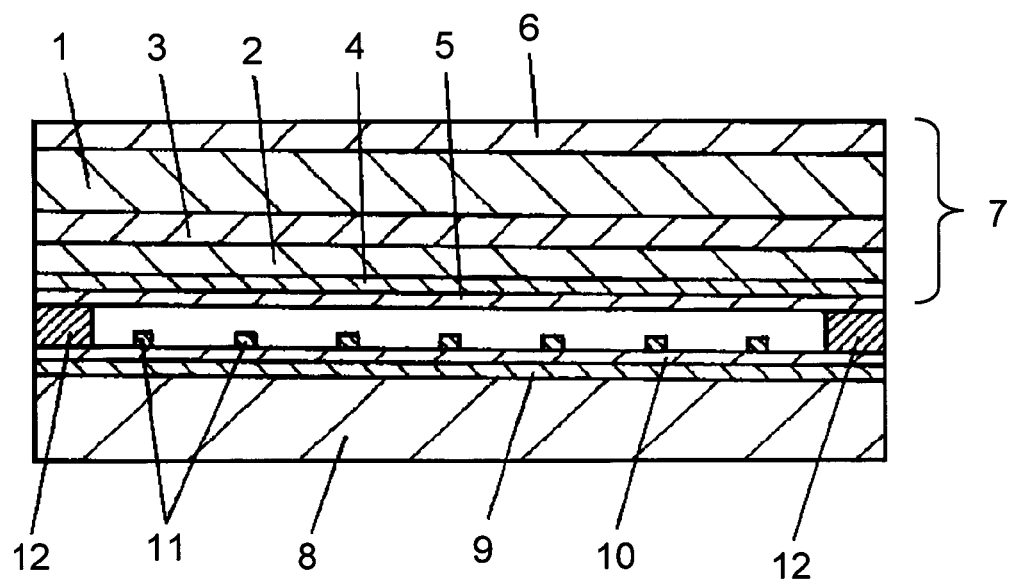
FIG. 2 shows a sectional view of a conventional transparent touch panel.

In a conventional touch panel shown in FIG. 2, undercoat layer 4 and upper electrical conductive layer 5 have been formed on lower film 2 of 25 $\mu$m thickness, and hard coat layer 6 has been formed on upper film 1 of 125 $\mu$m thickness. Lower film 2 is stuck to upper film 1 using acrylic adhesive 3 (e.g., "Scotch 8141" of 25 $\mu$m thickness manufactured by 3M), thereby making light transmitting sheet 7. Sheet 7 is stuck to substrate 8, on which lower electrical conductive layer 10 and dot spacers 11 are formed on an upper surface, using a frame shaped spacer 12 to which adhesive is applied on an upper surface and a lower surface. Thus, a transparent touch panel of the comparative example is provided.

Pressure Test

Upper surfaces of sheet 27 and sheet 7 are continuously pressed by 2.5 N load for 30 minutes using a polyacetal-made pen whose tip shape is a sphere of R 0.8 mm. After the pressure test mentioned above, whether a dent is generated or not is inspected. As a result, in the comparative example, when the load is removed, a dent is generated on the upper surfaces of sheet 7 which is formed with acrylic adhesive.

However, in this embodiment, when the load is removed, sheet 27 immediately returns (re-shapes) due to its elastic force and a dent is not observed.

Sliding Test

Upper surfaces of sheet 27 and sheet 7 are pressed by a 5N load using the pen mentioned above, and the pen is slid and reciprocated for a length of 30 mm at 2000 times/hour. After the sliding test mentioned above, whether the electrical conductive layer is damaged or not is inspected. As a result, damage is observed in a conventional sheet 7, in which acrylic adhesive is used, at reciprocating movements of 200 thousands times. However, damage is not observed in sheet 27 of this embodiment even after reciprocating movements of 300 thousands times.

In the pressure test and the sliding test mentioned above, conventional gel type adhesive is pressed and moves toward a circumference of the pressed point by pressing, so that a thickness at the pressed point becomes thin and elasticity deteriorates. On the contrary, solid rubber elastic layer 23 of this invention keeps its elasticity during the tests, and works as a buffer for upper electrical conductive layer 25.

As discussed above, the transparent touch panel in which a dent is hardly generated and the upper electrical conductive layer is hardly damaged can be obtained using this invention.

What is claimed is:

1. A transparent touch panel comprising:
    a light transmitting sheet including:
        a) a first electrical conductive layer;
        b) a first light transmitting film at said first electrical conductive layer;
        c) a second light transmitting film; and
        d) an adhesive layer arranged to attach said first light transmitting film to said second light transmitting film, said adhesive layer comprising a silicone rubber elastic layer having:
            a hardness in a range of 10–70 on measurement scale A of Rockwell hardness test in Japanese Industrial Standards;
            a compressive permanent distortion factor of no more than 50% under measurement conditions of 70° C. and 22 hours of B method in American Society for Testing and Materials;
            total light transmittance of at least 90%; and
            a thickness of at least 5 $\mu$m; and
    a light transmitting substrate including a second electrical conductive layer, said light transmitting sheet and said light transmitting substrate being attached to each other so that said first electrical conductive layer faces said second electrical conductive layer with a predetermined space formed therebetween.

2. The transparent touch panel of claim 1, wherein said second light transmitting film has an outer surface and an inner surface facing said first light transmitting film, said light transmitting sheet further including a hard coat layer on said outer surface.

3. The transparent touch panel of claim 1, wherein each of said first light transmitting film and said second light transmitting film has a thickness no more than 150 $\mu$m.

4. A transparent touch panel comprising:
    a light transmitting sheet to be pressed by a user, including:
        a) a first electrical conductive layer;
        b) a first light transmitting film at said first electrical conductive layer;
        c) a second light transmitting film; and
        d) a rubber elastic adhesive layer arranged to attach said first light transmitting film to said second light transmitting film; and
    a light transmitting substrate including a second electrical conductive layer, said light transmitting sheet and said light transmitting substrate being attached to each other so that said first electrical conductive layer faces said second electrical conductive layer with a predetermined space formed therebetween, and so that said light transmitting sheet is located at an outer side of said light transmitting substrate;
    wherein said rubber elastic adhesive layer comprises a silicone rubber elastic layer having:
        a hardness in a range of 10–70 on measurement scale A of Rockwell hardness test in Japanese Industrial Standards;
        a compressive permanent distortion factor of no more than 50% under measurement conditions of 70° C. and 22 hours of B method in American Society for Testing and Materials;
        total light transmittance of at least 90%; and
        a thickness of at least 5 $\mu$m.

5. The transparent touch panel of claim 4, wherein said second light transmitting film has an outer surface and an inner surface facing said first light transmitting film, said light transmitting sheet further including a hard coat layer on said outer surface.

6. The transparent touch panel of claim 4, wherein each of said first light transmitting film and said second light transmitting film has a thickness no more than 150 $\mu$m.

7. The transparent touch panel of claim 4, wherein said light transmitting sheet comprises a flexible light transmitting sheet.

8. An electronic apparatus comprising:
    an apparatus body; and
    a transparent touch panel attached to said body, said transparent touch panel comprising:
        a light transmitting sheet to be pressed by a user, including:
            a) a first electrical conductive layer;
            b) a first light transmitting film at said first electrical conductive layer;
            c) a second light transmitting film; and
            d) a rubber elastic adhesive layer arranged to attach said first light transmitting film to said second light transmitting film; and
        a light transmitting substrate including a second electrical conductive layer, said light transmitting sheet and said light transmitting substrate being attached to each other and arranged so that said first electrical conductive layer faces said second electrical conductive layer with a predetermined space formed therebetween, so that said light transmitting sheet is located at an outer side of said light transmitting substrate, and so that an inner surface of said light transmitting substrate faces said body while an outer surface of said light transmitting sheet faces away from said body;
    wherein said rubber elastic adhesive layer comprises a silicone rubber elastic layer having:
        a hardness in a range of 10–70 on measurement scale A of Rockwell hardness test in Japanese Industrial Standards;

a compressive permanent distortion factor of no more than 50% under measurement conditions of 70° C. and 22 hours of B method in American Society for Testing and Materials;

total light transmittance of at least 90%; and a thickness of at least 5 µm.

9. The electronic apparatus of claim 8, wherein said second light transmitting film has an outer surface and an inner surface facing said first light transmitting film, said light transmitting sheet further including a hard coat layer on said outer surface.

10. The electronic apparatus of claim 8, wherein each of said first light transmitting film and said second light transmitting film has a thickness no more than 150 µm.

11. The electronic apparatus of claim 8, wherein said light transmitting sheet comprises a flexible light transmitting sheet.

* * * * *